United States Patent
Sugino et al.

[11] Patent Number: 6,045,165
[45] Date of Patent: Apr. 4, 2000

[54] THREADED CONNECTION TUBULAR GOODS

[75] Inventors: Masaaki Sugino, Amagasaki; Miyuki Yamamoto, Izumiotsu, both of Japan

[73] Assignee: Sumitomo Metal Industries, Ltd., Osaka, Japan

[21] Appl. No.: 09/049,976

[22] Filed: Mar. 30, 1998

[51] Int. Cl.⁷ ........................................ F16L 25/00
[52] U.S. Cl. ................... 285/333; 285/334.4; 285/333; 285/390
[58] Field of Search ................ 285/334.4, 333, 285/334, 390

[56] References Cited

U.S. PATENT DOCUMENTS

| | | | |
|---|---|---|---|
| 2,239,942 | 4/1941 | Stone et al. | 285/334.4 |
| 2,258,066 | 10/1941 | Oyen | 285/334.4 |
| 2,992,019 | 7/1961 | MacArthur | 285/334.4 |
| 3,856,337 | 12/1974 | Ehm et al. | 285/334.4 |
| 3,870,351 | 3/1975 | Matsuki | 285/334 |
| 4,384,737 | 5/1983 | Reusser | 285/334 |
| 4,732,416 | 3/1988 | Dearden et al. | 285/33 |
| 4,822,081 | 4/1989 | Blose | 285/334 |
| 4,958,862 | 9/1990 | Cappelli et al. | 285/334 |
| 5,649,725 | 7/1997 | Nagasaku et al. | 285/334.4 |

FOREIGN PATENT DOCUMENTS

| | | | |
|---|---|---|---|
| 2134274 | 8/1972 | Germany | 285/334 |
| 2438387 | 2/1976 | Germany | 285/333 |
| 52-11767 | 4/1977 | Japan . | |
| 56-109975 | 8/1981 | Japan . | |
| 58-142475 | 9/1983 | Japan . | |
| 60-26878 | 2/1985 | Japan . | |
| 63-6293 | 1/1988 | Japan . | |
| 1-199088 | 8/1989 | Japan . | |
| 7510249 | 3/1977 | Netherlands | 285/334 |

*Primary Examiner*—Eric K. Nicholson
*Attorney, Agent, or Firm*—Armstrong, Westerman, Hattori, McLeland and Naughton

[57] ABSTRACT

A threaded connection for the oil country tubular goods, according to the invention, is provided with either an internal shoulder or an external shoulder or both, each comprising a seal portion and a torque shoulder, and characterized by satisfying the following conditions (1) and (2):

(1) A pitch diameter of the seal forming face on the pin is larger than the same on the box; and

(2) An inclination of the torque shoulder forming face on the pin is smaller than the same on the box, the difference in the inclination between the both sides being in the range of 0.5 to 4.0°.

The threaded connection for the oil country tubular goods, according to the invention, has excellent gas tightness and crevice corrosion resistance. Moreover, the production cost thereof is equivalent to that of conventional threaded connections and it is easy to handle. Hence, it is quite suited for use in exploration and exploitation of deposits located at great depths under high pressures and deposits such as gas, crude oil, or the like containing highly corrosive impurities.

3 Claims, 4 Drawing Sheets

Prior Art

(b)

Prior Art

Prior Art

THREADED CONNECTION TUBULAR GOODS

TECHNICAL FIELD

The present invention relates to a threaded connection for connecting oil country (oilfield) tubular goods used for exploration and exploitation of natural gas and crude oil deposited underground, and particularly, to a threaded connection for the oil country tubular goods, suited for drawing up the deposits from deep oil wells under high pressure conditions and gas fields and oil fields containing large amounts of corrosive impurities.

BACKGROUND TECHNOLOGY

Threaded connections are in widespread use as connection for connecting the oil country tubular goods used for exploration of natural gas fields, oil fields, and the like located at depths of several thousands meters, and for exploitation of deposits therefrom. There are two types of threaded connections for the oil country tubular goods. One is an integral type of threaded connection provided with a pin at one end of a pipe, and a box at the other end of the pipe so that respective ends of two pipes are connected with each other by screwing the pin into the box. The other is a coupling type of threaded connection for connecting respective ends of two pipes with each other, each pipe provided with a pin at both ends, by means of a coupling provided with two boxes. The followings are performance required of these threaded connections in common:

- ability to withstand axial tensile force caused by weights of connected pipes themselves
- ability to withstand internal pressure caused by a fluid flowing inside the pipes, and external pressure caused by fluids flowing outside the pipes
- durability to enable repeated uses as frequent scores of times
- ability to resist corrosion and erosion caused by fluids flowing inside and outside the pipes Lately, depths of oil wells have increased, and more often, oil is exploited from oil wells in severe environments, for example, in the polar regions. Consequently, in an increasing number of cases, the oil country tubular goods and the threaded connections are used in such severe environments. Furthermore, deposits which were not intended for exploitation before have since come to be exploited. These include, for example, a deposit which is corrosive to steel and contains significant amounts of oxidizing impurities. Accordingly, threaded connections capable of satisfying requirements described above in such severe environments are called for, and the performance of the threaded connections has since been improved at a high pace.

Figure 1:
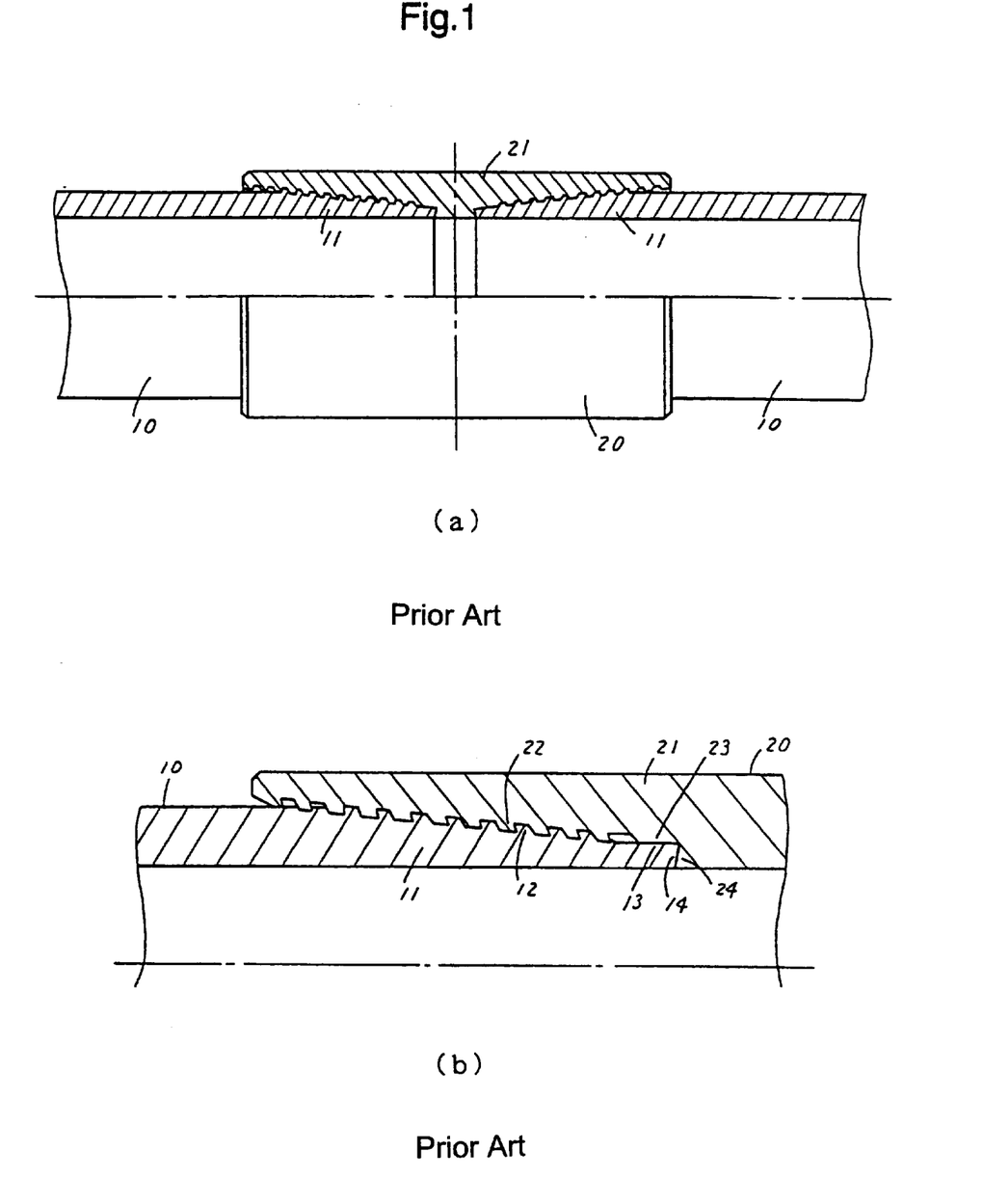
FIG. 1 is a view of a conventional coupling type threaded connection provided with a seal portion and a torque shoulder portion, showing an internal shoulder type by way of example.

FIG. 1 is a schematic illustrating a coupling type threaded connection provided with a seal portion and a torque shoulder portion. In the figure, an example of the threaded connection for the oil country tubular goods provided with the torque shoulder portion internally is shown. FIG. 1 (a) is a view showing pipes body 10 and a coupling 20 making up the threaded connection. FIG. 1 (b) is a partially enlarged view of a threaded portion, the seal portion, and the torque shoulder portion, as shown in FIG. 1 (a).

The torque shoulder portion is provided to prevent build-up of such a high contact pressure as to cause plastic deformation of the seal portion. The threaded connection is constituted such that a make-up torque can be controlled to an appropriate value by contacting a torque shoulder forming face 24 on the coupling side against a torque shoulder forming face 14 on the pipe side. Such a type of threaded connection provided with the torque forming faces 14 and 24, close to the inner surface of a pipe, as described above or the torque shoulder portion is called an internal shoulder.

Figure 2:
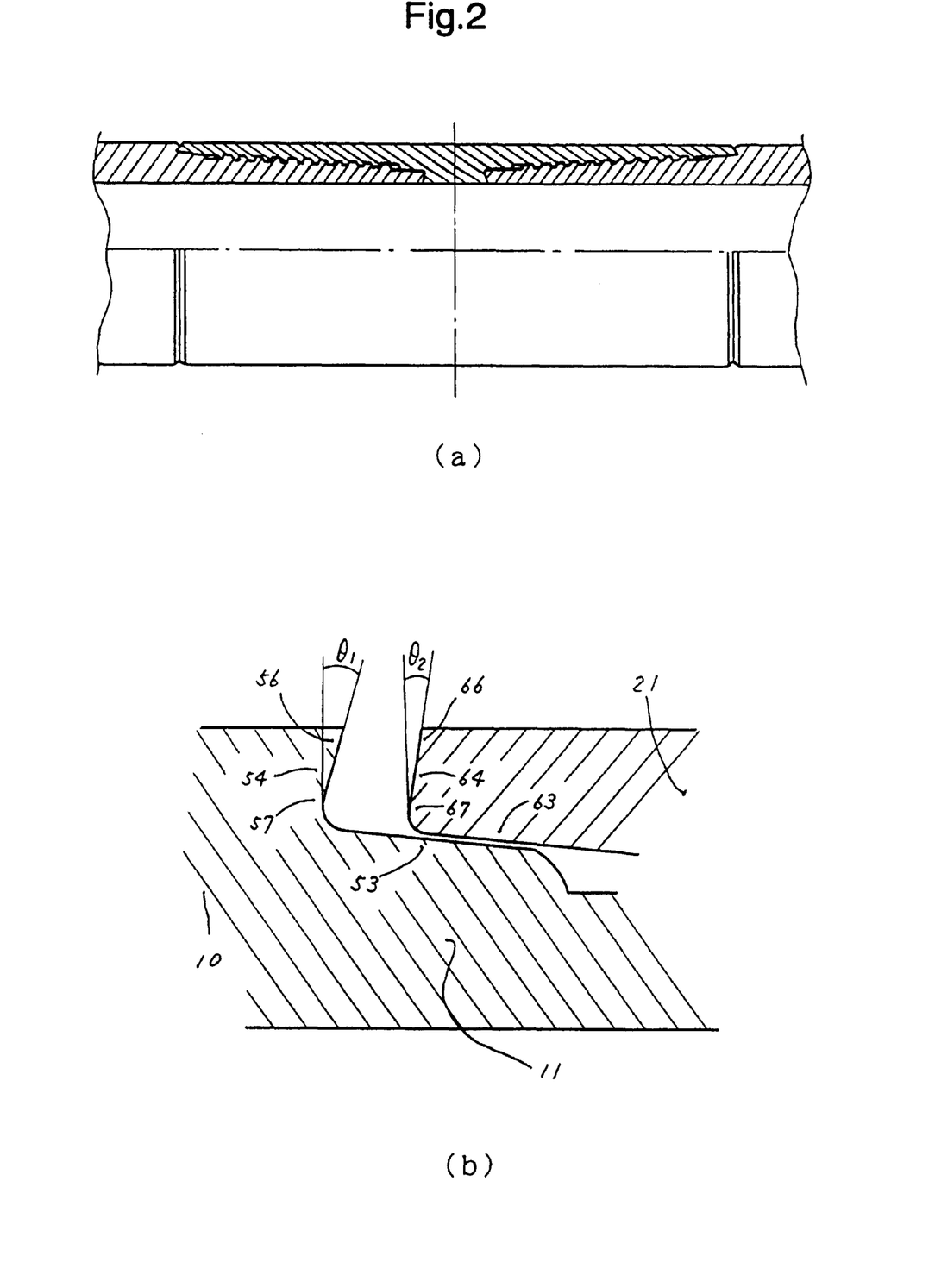
FIG. 2 is a view showing a coupling type threaded connection provided with both the internal shoulder and an external shoulder.

FIG. 2 is a schematic illustrating an example of a threaded connection for the oil country tubular goods, provided with both the internal torque shoulder and an external torque shoulder. FIG. 2 (a) is a sectional view showing the pipe body and the coupling after the threaded connection is made up. FIG. 2 (b) is a partially enlarged view of the torque shoulder forming portion on the outer side of the threaded connection shown in FIG. 2 (a), showing inclinations of the torque shoulder forming faces on a pin and a box, respectively, for forming an external torque shoulder. The external torque shoulder is formed when the torque shoulder forming face 54 disposed at the root of a male thread section on the outer surface of the pipe is contacted against the torque shoulder forming face 64 disposed at the tip on the box.

Among the coupling type threaded connections, provided with a seal portion and a torque shoulder portion, an internal shoulder type threaded connection is described hereafter.

In FIG. 1 (b), male threads 12 provided on the surface of a tip portion of the pipe 10 and female threads 22 provided on the inner surface of the coupling 20 are mated with each other. A seal forming face 13, which is a rotatable face, is provided at the tip of a pin 11. The seal forming face 13 has a curved surface, tapered in the axial direction of the pipe or substantially resembling a circular arc of a large curvature radius. A box 21 of the coupling 20 is provided with a seal forming face 23, which is a rotatable face, at the root of a threaded portion thereof, and the seal forming face 23 has a curved surface tapered in the axial direction of the pipe. The seal portion is formed when the seal forming face 13 of the pipe body is brought into contact with the seal forming face 23 of the coupling for making up the threaded connection.

Owing to metal-to-metal seal accomplished at the seal portion, gas tightness of the threaded connection is maintained against internal pressure caused by a fluid flowing inside the oil country tubular goods, and external pressure caused by fluids flowing outside same.

The torque shoulder portion is formed when a torque shoulder forming face 14 on the pin, disposed beyond the seal forming face 13 of the pipe body, closer to the tip, is contacted against a torque shoulder forming face 24 disposed on the inner side of the seal forming face 23 on the box of the coupling.

In the case of the threaded connection for the oil country tubular goods, corrosion resistance against crevice corrosion causing leakage of fluids or rupture of the threaded portion is called for in addition to seal tightness against fluids under high pressure as described in the foregoing. Crevice corrosion occurs when a corrosive fluid intrudes into minuscule crevices formed between pin members and box members, stagnates therein, and consequently are enriched. When the threaded connection is loaded with high stress and placed under the conditions described above, crevice corrosion such as general corrosion, stress corrosion cracking, or the like occurs inside the threaded connection. No crevice corrosion occurs, however, in case that there exists no minuscule crevice on either the inner surface or the outer surface side of the pipe in which a corrosive fluid exists.

Threaded connections provided with the seal portion and the torque shoulder in shapes described hereafter have been proposed as improvements on the threaded connection shown in FIG. 1 for enhancing crevice corrosion resistance. These threaded connections are broadly classified into four classes, that is, one provided with contact faces coated with a softer material, one using a packing, one having enhanced seal tightness of the seal portion, taking advantage of elastic deformation of the pin at the tip thereof, and one having enhanced gas tightness of the seal portion by means of a device for improved contact of the torque shoulder forming faces.

The threaded connections with contact faces coated with a softer material as disclosed in Japanese Patent Laid-open (Kokai) No. 56-109975, No. 1-199088, and the like have a drawback in that gas tightness thereof is impaired in the course of repeated making up and disconnection of the threaded connection due to exfoliation and wear-out of the coating material with the result that these threaded connections are unable to withstand repeated uses as frequent as scores of times.

In the case of the threaded connection using a packing as disclosed in Japanese Patent Laid-open (Kokai) No. 58-142475, same has a drawback of extra time and expenses required in production, fitting, and the like of the packing. Further, in the case of this type of threaded connection without a function for controlling a torque for make-up at an appropriate value, which is naturally required of the torque shoulder, strict torque control is required at a work site when making up connection. Consequently, operativity of the threaded connection is poor. In addition, same poses a problem of susceptibility to crevice corrosion because crevices may be formed between the packing and the torque shoulder depending on manufacturing tolerance.

In the case of the threaded connection having enhanced gas tightness, taking advantage of elastic deformation occurring at the tip of the pin (for example, as disclosed in Japanese Patent Laid-open (Kokai) No. 60-26878), substantial bending deformation needs to be caused to occur to a lip portion at the tip of the pin in order to obtain a seal face having a sufficient contact pressure in a seal forming portion. For this purpose, the lip portion at the tip of the pin needs to be pressed by a large force to the torque shoulder forming face on the box. As a result, excessive plastic deformation occurs on the torque shoulder forming face, particularly, at a portion in close vicinity of the pipe surface.

Figure 3:
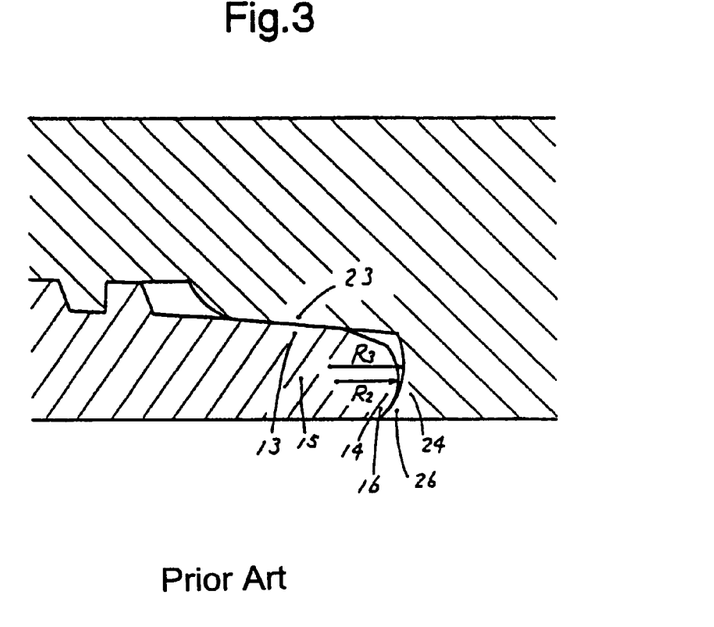
FIG. 3 is a view illustrating a conventional threaded connection wherein seal tightness of a seal portion is enhanced as a result of swelling in the direction of the outside diameter of the pipe occurring to a portion of a pin, close to the tip thereof, when a torque shoulder forming face (convex) on the pin and a torque shoulder forming face (concave) on a box come into contact with each other with the center of curvature of respective faces being disposed at a differentiated point.

FIG. 3 shows an example of the threaded connection having enhanced gas tightness by devising improved contact on the torque shoulder forming faces (refer to Japanese Patent Laid-open (Kokai) No. 52-11767). With the threaded connection, swelling of the pin in close vicinity of the tip thereof is caused to occur in the direction of the outside diameter of the pipe through contact between the torque shoulder forming face on the pin and same on the box so that seal tightness of the seal portion is enhanced. More specifically, a seal forming face 13 on the pin is rendered a rotatable face having a surface in the shape of a circular arc of a large curvature radius in sectional view, and a seal forming face on the box is rendered a circular cone (a rotatable face having a surface of a tapered straight line in sectional view). Furthermore, a torque shoulder forming face 14 on the pin and a torque shoulder forming face 24 on the box are rendered to have a convex surface and a concave surface, respectively, each having a differentiated curvature radius, R2 and R3. In this connection, the curvature radius R2 of the torque shoulder forming face on the pin is rendered smaller than the curvature radius R3 of the torque shoulder forming face on the box, and in addition, the center of the curvature with the radius R2 is positioned on the inner side towards the pipe than that of the curvature with the radius R3. With adoption of such a constitution as described above, bending of the lip portion 15 on the pin towards the inner surface of the pipe is reduced, and even when nonuniform contact pressure is developed in the peripheral direction of the seal portion due to manufacturing tolerances, uniform contact pressure is automatically redistributed. It is claimed for this reason that satisfactory seal tightness is provided at two locations, namely, the torque shoulder portion and the seal portion.

In the threaded connection described, contact at the torque shoulder portion is linear contact along a circular face at portions 16 and 26 in close vicinity of the inner surface of the pipe. Consequently, contact pressure at such contact portions becomes very high, creating a problem of gas tightness being impaired due to excessive deformation, similarly to the case of the threaded connection as disclosed in Japanese Patent Laid-open (Kokai) No. 60-26878 described above.

The invention has been developed to solve the problems described above, encountered by the conventional threaded connections. Thus, it is an object of the invention to provide a threaded connection capable of preventing initiation of crevice corrosion without bringing about an increase in manufacturing cost thereof and deterioration in operativity, and also of demonstrating a high degree of gas tightness even after repeated uses as frequent as scores of times.

DISCLOSURE OF THE INVENTION

The threaded connection for the oil country tubular goods, according to the invention, has the advantage of less intense crevice corrosion, and an ability to maintain gas tightness sufficient for practical application even after repeated uses as frequent as scores of times.

In summary, the threaded connection according to the invention includes (A), (B), and (C) described hereafter:
(A) A threaded connection for the oil country tubular goods, wherein a seal portion is formed when a seal forming face 13 provided on the outer surface of the end portion of a pin 11 of a pipe body, with male threads formed thereon, is fitted to a seal forming face 23 provided on the inner surface of a box 21 of a coupling or a pipe body, with female threads formed thereon, while an internal torque shoulder is formed when a torque shoulder forming face 14 provided at the tip of the pin is butted against a torque shoulder forming face 24 provided on the box, opposite to the torque shoulder forming face 14, and satisfying the following conditions (1) and (2):
(1) The seal forming faces on the pin and box, respectively, are rotatable faces, and the pitch diameter of the seal forming face 13 on the pin prior to making up the threaded connection is larger than a pitch diameter of the seal forming face 23 on the box prior to making up the threaded connection; and (2) An inclination (θ1) of the torque shoulder forming face on the pin prior to making up the threaded connection is smaller than an inclination (θ2) of the torque shoulder forming face on the box prior to making up the threaded connection, the difference (Δθ) between the both inclinations being in the range of 0.5 to 4.0°.

(B) A threaded connection for the oil country tubular goods, wherein with reference to FIG. 2 (b), a seal portion is formed when a seal forming face 53 provided on the outer surface of a pin 11 of a pipe body, close to the base thereof, with male threads formed thereon, is fitted to a seal forming face 63 provided on the inner surface of a box 21 of a coupling or a pipe body close to these tips thereof, with female threads formed thereon, while an external shoulder is formed when a torque shoulder forming face 64 provided at the tip of the box is contacted against a torque shoulder forming face 54 provided on the outer surface of the pin of the pipe body, close to the base thereof, opposite to the torque shoulder forming face 64, and satisfying the above described condition (1), and the following condition (3).

(3) An inclination (θ1) of the torque shoulder forming face on the pin, prior to making up the threaded connection is larger than an inclination (θ2) of the torque shoulder forming face on the box prior to making up the threaded connection, the difference (Δθ) between both inclinations being in the range of 0.5 to 4.0°.

(C) A threaded connection for the oil country tubular goods, wherein all of the seal portion, the internal shoulder and the external shoulder as described in (A) and (B) above are provided.

The the condition including the above described conditions (2) and (3) can be presented as the following condition (4).

(4) Regarding to the relation between the inclination (θ1) of the torque shoulder forming face on the pin, prior to making up the threaded connection, and the inclination (θ2) of the torque shoulder forming face on the box, prior to making up the threaded connection, θ1 is smaller than θ2 for the internal shoulder type and θ1 is larger than θ2 for the external shoulder type, the difference (Δθ) between both inclinations being in the range of 0.5 to 4.0°.

The threaded connections for the oil country tubular goods, described in (A), (B), and (C) above, are preferably to satisfy the following condition (5) as well:

(5) The difference (Δθ) between the inclination (θ1) of the torque shoulder forming face on the pin prior to making up and the inclination (θ2) of the torque shoulder forming face on the box prior to making up is proportional to D/t, and δr, respectively. In case the value of D/t or δr is large, the difference in inclination (Δθ) between the torque shoulder forming face on the pin and the same on the box is increased, and in case the value of D/t or δr is small, the difference in inclination (Δθ) between the torque shoulder forming face on the pin and the same on the box is reduced wherein
D: outside diameter of the tip of the pin or box
t: wall thickness of the tip of the pin or box
δr=(interference on the seal forming face in the direction of the diameter)−(interference on the thread portion in the direction of the diameter).

The threaded connection for the oil country tubular goods, described in the foregoing, is unsusceptible to crevice corrosion, maintaining gas tightness sufficient for repeated uses as frequently as scores of times. Furthermore, manufacturing cost thereof is held down owing to its simple structure, and it is easy to handle.

The pitch diameter of the seal forming face on the pin and box, respectively, is defined as follows. Said diameter is a diameter of the respective seal forming faces at predetermined base positions prior to make-up, that is, two times of an average distance between the central axis of the pipe or the box and the base positions for the respective seal forming faces. The base position refers to a region corresponding to parts where the seal forming face on the pin and same on the box come in contact with each other when the threaded connection is completed, and means the position prior to fitting.

BRIEF DESCRIPTION OF THE DRAWINGS

FIG. 1 (a) is a view showing a pipe body and a coupling, making up a threaded connection. FIG. 1 (b) is a partially enlarged view of a threaded portion, a seal forming portion and a torque shoulder forming portion in FIG. 1 (a).

FIG. 2 (a) is view showing the pin and the box, making up the threaded connection, and FIG. 2 (b) a partially enlarged view of the external shoulder shown in FIG. 1 (a).

FIG. 5 (a) is a view showing a seal forming face and a torque shoulder forming face on a pin and a box, respectively, prior to making up the connection. FIG. 5 (b) is a view showing distribution of contact pressure developed at the seal portion and the torque shoulder after the connection is made up.

BEST MODE FOR CARRYING OUT THE INVENTION

As described in the foregoing, the threaded connection for the oil country tubular goods, according to the invention, is characterized in satisfying conditions (1) and (2) or (1) and (3), namely (1) and (4) given hereinafter. The threaded connection according to the invention has performance characteristics of preventing initiation of crevice corrosion and demonstrating high degree of gas tightness even after repeated uses as frequent as scores of times provided that said conditions are satisfied. Furthermore, the threaded connection does not entail any increase in manufacturing cost, and is easy to handle.

(1) The pitch diameter of the seal forming face 13 on the pin prior to making up the threaded connection is larger than a pitch diameter of the seal forming face 23 on the box prior to making up the threaded connection; and (4) Regarding to the relation between the inclination ($\theta 1$) of the torque shoulder forming face on the pin, prior to making up the threaded connection, and the inclination ($\theta 2$) of the torque shoulder forming face on the box, prior to making up the threaded connection, $\theta 1$ is smaller than $\theta 2$ for the internal shoulder type and $\theta 1$ is larger than $\theta 2$ for the external shoulder type, the difference ($\Delta \theta$) between the both inclinations being in the range of 0.5 to 4.0°.

The reason why the threaded connection according to the invention is unsusceptible to crevice corrosion and can withstand frequent repeated uses is described hereafter.

Figure 4:
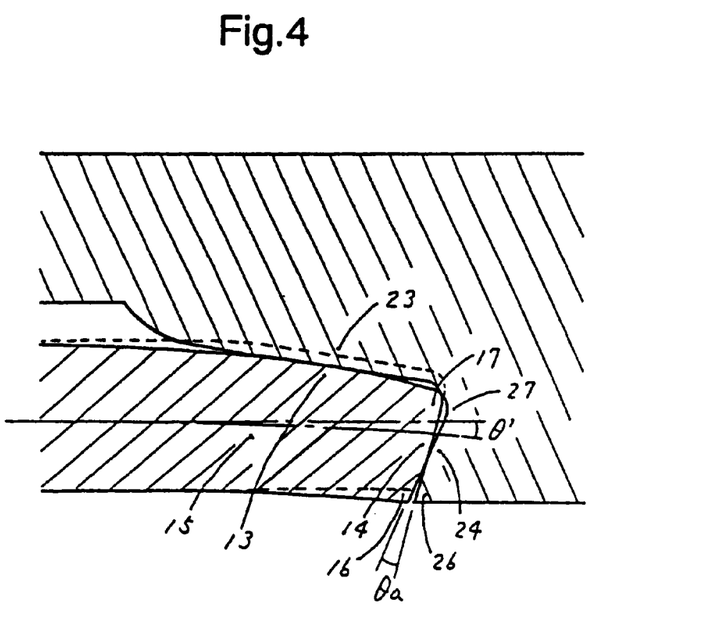
FIG. 4 is a view illustrating the torque shoulder forming face on the pin bending by θ a relative to the torque shoulder forming face on the box due to bending deformation in the direction of shrinkage in diameter occurring to a seal forming face of a larger pitch diameter.

FIG. 4 is a view illustrating the torque shoulder forming face on the pin bending by $\theta$ a relative to the torque shoulder forming face on the box due to shrinkage deformation occurring to the seal forming face on the pin. As shown in the figure, the seal forming face and the torque shoulder forming face are disposed in close vicinity of the tip of the pin, and consequently, a lip portion 15 at the tip of the pin undergoes bending deformation in the direction of shrinkage in diameter due to contact pressure building up at the seal forming faces 13 and 23 when making up the threaded connection. The bending deformation causes the torque shoulder forming face 14 on the pin to bend by $\theta$a relative to the torque shoulder forming face 24 on the box towards the inner side of the pipe.

In the conventional type threaded connection wherein the torque shoulder forming face on the pin and box, respectively, bends by an identical angle, contact pressure developed at portions denoted by 16 and 26 of the torque shoulder region, on the inner side thereof towards the pipe, is low due to bending deformation occurring in the form described above. Therefore, when a large tensile stress is applied to the pipe body including the threaded connection already made up, crevices are apt to be formed on the inner face side of the torque shoulder because contact pressure scarcely exists there.

On the other hand, in the case of the threaded connection according to the invention, the difference $\Delta \theta$ in inclination between the torque shoulder forming face on the pin and same on the box, having the relations of the before described (2), (3) or (4), is set beforehand. Furthermore, as the difference $\Delta \theta$ is restricted within the range of 0.5 to 4.0°, the both faces come into contact with each other after bending deformation of the tip of the pin section taking place due to the connection being made up so as to be flush with each other or overlapped by each other on the inner face side of the torque shoulder. Consequently, large contact pressure is developed, and distribution of contact pressure in most preferable pattern is obtained.

Figure 5:
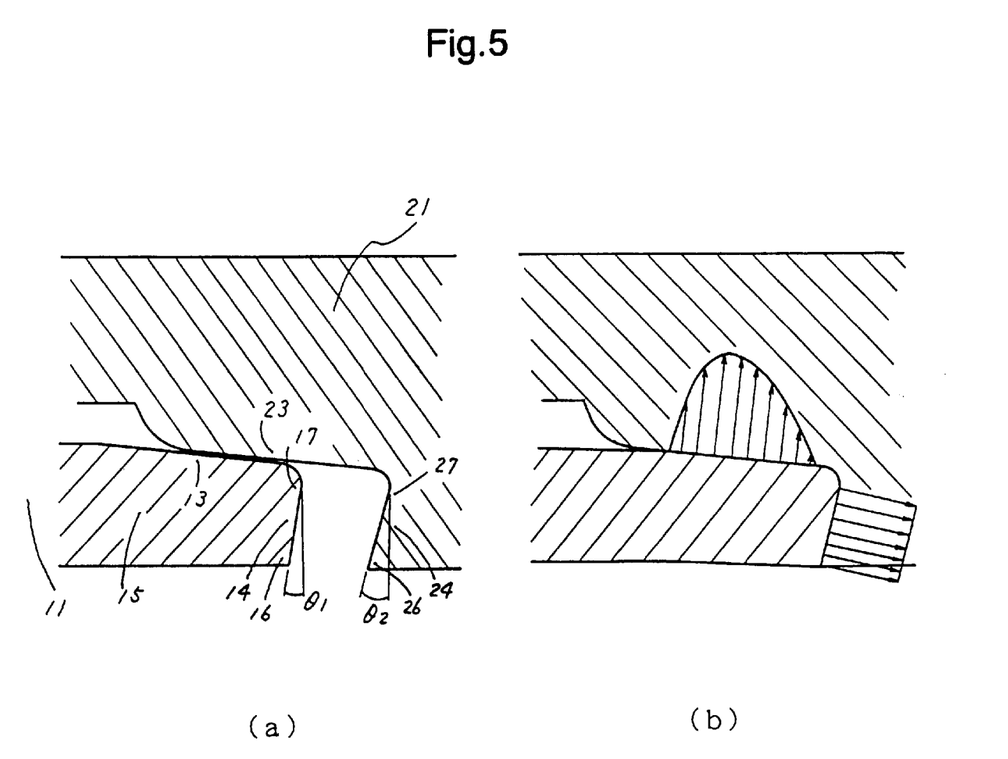
FIG. 5 is a view showing a threaded connection according to the invention, provided with a seal portion and a torque shoulder.

With reference to FIG. 5, description in further detail is given hereafter. FIG. 5 is a view showing a structure of the threaded connection, in close vicinity of the internal shoulder wherein an inclination ($\theta 1$) of the torque shoulder forming face on the pin is rendered smaller than an inclination ($\theta 2$) of the torque shoulder forming face on the box. FIG. 5 (*a*) is a view showing the seal forming face and the torque shoulder forming face on the pin and the box, respectively, of the threaded connection prior to being made up. FIG. 5 (*b*) is a view showing distribution of contact pressure (results of computation) built up on the seal portion and the torque shoulder after the threaded connection is made up. It is confirmed from FIG. 5 that evenly distributed contact pressure is obtained by preestimating the bending deformation of the torque shoulder forming face on the pin, as described above, and reducing the inclination of the torque shoulder forming face on the pin to that extent.

The structure of the threaded connection according to the invention is applicable to a threaded connection provided with an external shoulder. As shown in FIGS. 2 (*a*) and 2 (*b*), even distribution of contact pressure is obtained at the external shoulder by differentiating the inclination of the torque shoulder forming face on the pin from same on the box.

The threaded connection according to the invention is hereafter described in greater detail.

[$\Delta \theta$: difference in inclination between the torque shoulder forming face on the pin and same the box]

The seal forming face on the pin is a rotatable face with a surface shaped in a tapered curve or a circular arc of a large curvature radius, and the seal forming face on the box is a rotatable face with a surface shaped in a tapered curve.

The pitch diameter of the seal forming face on the pin is rendered larger than that on the box. As described in the foregoing, the pitch diameter refers to the diameter of the seal forming face on the pin in the base position and same on the box in the base position, respectively.

In case that the pitch diameter of the pin to be fitted into the box, is larger than that of the box, and the pin is forced to be fitted into the box, shrinkage deformation occurs to the tip portion of the pin, having a low rigidity. The shrinkage deformation occurring to the tip portion causes the tip portion to undergo bending deformation towards the inner side surface of the pipe. Consequently, the torque shoulder forming face on the pin dips to an extent of such bending deformation (refer to FIG. 4).

In the threaded connection of the internal shoulder type shown in FIG. 5(*a*), the inclination $\theta 1$ of the torque shoulder forming face 14 on the pin is smaller than the inclination $\theta 2$ of the torque shoulder forming face 24 on the box, by $\Delta \theta$ (=$\theta 2 - \theta 1$). On the other hand, for the external shoulder type, the inclination $\theta 1$ of the torque shoulder forming face on the pin is larger than the inclination $\theta 2$ of the torque shoulder forming face on the box, by $\Delta \theta$ (=$\theta 2 - \theta 1$).

The difference $\Delta \theta$ in inclination may preferably be set to be equivalent to or slightly larger than a change $\theta$a in inclination actually taking place as a result of the bending deformation described in the foregoing. As shown in FIG. 4, the change $\theta$a in inclination due to the bending deformation actually taking place is substantially equivalent to a bending angle $\theta'$ of the torque shoulder forming face 14 on the pin when bending deformation is caused to occur to the lip portion 15 located close to the tip of the pin due to contact pressure developed at the seal forming faces. Herein, the bending angle refers to an angle of bending occurring to the lip portion 15, located close to the tip of the pin, when subjected to a lateral load or bending moment.

Contact pressure in the torque shoulder region is distributed as follows by differentiating the inclination of the torque shoulder forming face on the pin from same on the box:

(a) substantially even distribution of contact pressure across the torque shoulder forming faces 14 and 24 on the pin and the box, respectively; or (b) distribution of contact pressure such that contact pressure remains high at portions denoted by 16 and 26, on the inner side surface of the pipe, and gradually declines closer to the seal forming faces 17 and 27.

Accordingly, stress concentration does not occur in such a way as to cause excessive plastic deformation at 16 and 26 in close vicinity of the inner side surface of the pipe. Further, contact pressure sufficient to prevent crevices from being formed in said regions is secured. Hence, the threaded connection for the oil country tubular goods, capable of withstanding repeated uses as frequent scores of times, and nearly preventing crevice corrosion is provided.

Since the torque shoulder forming face on the pin and same on the box are kept in contact with each other at substantially even contact pressure, localized plastic deformation due to like stress concentration does not occur. In case that a tensile stress is applied to the pipe body including the threaded connection made up in such a condition described above, contact pressure throughout the torque shoulder is uniformly reduced, and consequently, a critical value for tensile stress causing opening in the torque shoulder portion becomes by far higher than that for a threaded connection provided with a torque shoulder formed in a conventional shape. Thus, the torque shoulder is formed, which is unsusceptible to opening even when a tensile stress equivalent to yield strength of the pipes body is applied provided that contact pressure is sufficiently high when the threaded connection is made up. Subsequently, the threaded connection is provided with excellent crevice corrosion resistance.

In the case of a threaded connection wherein the torque shoulder forming face 14 on the pin has an inclination identical to that for the torque shoulder forming face 24 on the box, even distribution of contact pressure at the torque shoulder faces is not achieved. With such a threaded connection as above, contact pressure developed on the seal forming faces becomes high while contact pressure on the inner side surfaces of the pipes becomes low. Consequently, in case of tensile stress caused by the pipes' own weight, and the like coming into play after the threaded connection is made up, the contact pressure on the inner side surface of the pipes is reduced very low, causing opening in such a region of the threaded connection in an extreme case. When the threaded connection is used under such a condition for many hours, there occurs ingress of a corrosive fluid under a high internal pressure into the interior of the threaded connection through crevices formed between 16 and 26 on the inner side surface of the pipes inside the threaded connection. As a result, corrosion occurs to the seal portion and also to a threaded portion subjected to a high stress, resulting in leakage of the fluid or rupture of the threaded connection in the worst case. With the threaded connection according to the invention, such troubles can be prevented until the number of times when same is put to use reaches at least some scores.

Even in case that a compressive stress in place of a tensile stress is applied, contact pressure developed across the torque shoulder surfaces is substantially uniform. Accordingly, the torque shoulder is unsusceptible to localized plastic deformation due to stress concentration occurring therein. Thus, there occurs no excessive plastic deformation to such an extent that repeated use thereof is rendered impractical. Herein, the extent that repeated use thereof is rendered impractical refers to a condition wherein the torque shoulder is no longer able to function as torque controller and substitute seal due to permanent deformation of the torque shoulder on the box, in particular, and the threaded connection can not be properly made up, failing to demonstrate intended performance thereof.

An exceedingly large $\Delta\theta$ is not preferable. In case of $\Delta\theta$ being exceedingly large, stress concentration occurs to the inner side of the torque shoulder, resulting in occurrence of localized plastic deformation. There exists an appropriate range for $\Delta\theta$ as described hereinafter.

Appropriate Range for $\Delta\theta$

The bending angle $\theta$ (refer to FIG. 6) of bending deformation of the lip portion 15 on the pin in the direction of shrinkage thereof, occurring when the seal forming face 13 on the pin is fitted onto the seal forming face 23 on the box, can be found by a computation formula based on the classic shell theory. Further, a correlation between the bending angle $\theta$ found by the computation formula and the change in inclination $\theta$ a actually occurring has already been established from the results of tests. Hence, the change in inclination $\theta$a of the torque shoulder forming face on the pin which actually occurs can be found by finding the bending angle $\theta$" of the tip of the pin. The difference in inclination $\Delta\theta$ between the torque shoulder forming face on the pin and same the box needs to be set to be equivalent to or slightly larger than the change in inclination $\theta$a.

With the threaded connection for the oil country tubular goods in industrial application, the difference in inclination $\Delta\theta$ is to fall within a range of 0.5 to 4.0°. In the event that same is less than 0.5°, sufficient sealing effect can not be obtained. On the other hand, in the event of same exceeding 4°, localized plastic deformation occurs due to stress concentration occurring on the inner side surface of the torque shoulder as described in the foregoing. Thereupon, not only the number of times when the threaded connection can be put to repeated use decreases, but also same becomes more susceptible to formation of crevices.

The threaded connection having the angles described above can be worked on with precision sufficient for practical use, but without need for special means of precision control, by use of a computer-controlled NC lathe.

Selection of Most Optimum Value for $\Delta\theta$

As described in the foregoing, the difference in inclination $\Delta\theta$ remaining in the range of 0.5 to 4.0° suffices for providing performance sufficient for practical application. However, depending on conditions of the pipes and the threaded connection, more optimum values may preferably be selected.

In the case of the internal shoulder, Δθ may preferably be made proportional to (the outside diameter of the pin at the tip: D)/(the wall thickness of the pin at the tip: t) (hereinafter referred to as D/t). In the case of D/t being a large value, the internal shoulder is more susceptible to bending because of its low rigidity against bending. Therefore, the difference in inclination Δθ may preferably be made larger. Thus, depending on magnitude of D/t, the most optimum value for Δθ may preferably be selected.

Δθ may preferably be made substantially proportional to

δr {=(interference of the seal forming portion)—(interference of the thread forming portion)}.

The interference being a difference in pitch diameter between the pin and the box, the larger the δr is, the larger a shrinkage occurring becomes. As described above, the interference of the seal forming portion has effect on both the shrinkage of the pin at the tip and the bending of the torque shoulder forming face. However, in the event that the interference of the seal forming portion is equivalent to that of the thread forming portion, only uniform shrinkage occurs, causing no bending. The interference of the thread forming portion in close vicinity of the pipe body causes only uniform shrinkage deformation. In such a case, both the interference of the seal forming portion and same of the thread forming portion cause only shrinkage deformation, and maintain equilibrium.

In other words, a difference in the interference δr, obtained by deducting the interference of the thread forming portion, not contributing to bending, from the interference of the seal forming portion, causes bending deformation to occur. The Δθ which is set to be substantially equivalent to the bending angle of bending occurring in the direction of the inner side surface of the pipes is substantially proportional to δr. Accordingly, the most optimum value for the difference in inclination Δθ between the torque shoulder forming face on the pin and same on the box may preferably be selected so as to be substantially proportional to δr.

Conditions described in the foregoing, under which the internal shoulder operates, are also applicable to the external shoulder.

As shown in FIG. 2 (b), in case that the pitch diameter of the seal forming face 63 on the box is rendered smaller than that of the seal forming face 53 on the pin, the torque shoulder forming face 64 on the box is bent outwardly when the threaded connection is made up, changing inclination thereof. In the case of the external shoulder being under the influence of bending stiffness of the coupling unlike the case of the internal shoulder, the outside diameter and the wall thickness of the box at the tip are denoted by D and t, respectively. The tip of the box undergoes bending deformation due to bending stiffness thereof being lower than that at the root of the pin because the tip of the box is thinner in wall thickness and a free end. An inclination θ2 of the torque shoulder forming face on the box may preferably be set to be smaller than an inclination θ1 of same on the pin by said change θa in inclination or by an angle slightly larger than θa. Hereupon, substantially uniform contact pressure or contact pressure slightly higher at 56 and 66 on the outer surface and slightly lower at 57 and 67 on the respective seal forming faces is provided.

As a result, in the event that a tensile stress is applied to the threaded connection provided with the external shoulder, opening on the external side thereof is prevented. All other effects of the internal shoulder, as described above, are applicable in whole to the external shoulder as well.

All the conditions specified in the invention are also applicable straight to the threaded connection provided with both the internal shoulder and the external shoulder.

The coupling type threaded connection is described in the foregoing by way of example, but it is needless to say that the invention is applicable to the integral type threaded connection as well. In such a case, the pipe body may be provided with a pin at one end, comprising male threads, a seal forming face, and a shoulder forming face, and a box at the other end, comprising female threads, a seal forming face, and a shoulder forming face, after surfacing. Thus, the construction exactly same as that of the threaded connection according to the invention can be applied thereto.

Embodiments

The effects of the invention are described hereafter with reference to embodiments of the invention.

Tables 1, 2, 3, and 4 are lists showing the inclinations of the torque shoulders, and particulars of the threaded connections according to the embodiments of the invention, and threaded connections for comparative examples, on which tests were conducted. With reference to the threaded connections marked A through J shown in Tables 1 and 2, D/t and δr are in common at 17.78 and 0.4 mm, respectively. With reference to the threaded connections marked by K and L shown in Tables 3 and 4, D/t is 13.78, and δr is 0.199 mm for the former, and D/t 21.72, δr 0.528 for the latter, representing values either higher or lower than same for the threaded connections marked by A through J. In the case of the threaded connection K having both D/t and δr lower in value than same for the threaded connections A through J, the difference Δθ in inclination between the respective torque shoulder forming faces thereof is lower in value substantially in proportion to the D/t and δr while in the case of the threaded connection L having D/t and δr higher in value, the difference Δθ in inclination is higher in value proportionally.

The threaded connections according to the embodiments of the invention, in Tables 1 through 4 are the threaded connections shown in FIGS. 5 and 2, including three types consisting of the internal shoulder type, the external shoulder type, and the internal shoulder combined with the external shoulder type. The comparative examples shown in Table 2 include a threaded connection provided with the torque shoulder forming face on the pin and the box, each having an identical inclination, a threaded connection provided with the seal surface, and the like, coated with a softer metal, a threaded connection having the thin lip portion provided with smooth grooves (as disclosed in Japanese Patent Laid-open No. 60-26878), and a threaded connection (refer to FIG. 3) provided with the torque shoulder forming face on the pin and the box, having a convex surface and a concave surface, respectively, each having a differentiated curvature radius.

TABLE 1

| Item | in common with threaded connections marked A, B, C, D, E, F, G, H, I, and J |
|---|---|
| outside diameter of a pipe | 177.8 mm |
| wall thickness of a pipe | 10.36 mm |
| outside diameter of a coupling | 194.49 mm |
| material for a coupling and pipe | L80 type carbon steel yield strength: 56.2 kgf/mm$^2$) |
| thread shape | trapezoidal thread |
| thread pitch | 5.08 mm |
| taper of a threaded portion | 1/18 |
| thread ridge height | 1.575 mm |
| interference of a threaded portion (in the direction of dia.) | 0.2 mm |
| taper of a seal portion | 1/10 |
| length of a seal portion | 6.5 mm |
| interference of a seal portion (in the direction of dia.) | 0.6 mm |
| 80% of tensile load value | 245.2 tons |
| 80% of internal pressure value | 5.24 kgf/mm$^2$ |

TABLE 2

| | markings for threaded connections | inclination of torque shoulder on the pin($\theta$1) | inclination of torque shoulder on the box($\theta$2) | remarks |
|---|---|---|---|---|
| embodiments of the invention | A | 15.0° | 16.0° | internal shoulder |
| | B | 15.0° | 16.5° | internal shoulder |
| | C | 16.0° | 15.0° | external shoulder |
| | D | 16.5° | 15.0° | external shoulder |
| | E | 15.0° 16.0° | 16.0° 15.0° | combination of internal shoulder with external shoulder*1 |
| comparative examples | F | 15.0° | 15.0° | internal shoulder |
| | G | 15.0° | 15.0° | external shoulder |
| | H | 15.0° | 15.0° | coated with Cu*2 |
| | I | 15.0° | 16.0° | thin lip portion*3 |
| | J | 6 mm | 8 mm | torque shoulder faces of differentiated curvature radius*4 |

*1: a threaded connection provided with both the internal shoulder and the external shoulder (the same type as one shown in FIG. 2)
*2: a threaded connection having a seal forming face and a torque shoulder forming face, on the box, coated with Cu
*3: a threaded connection provided with a thin-walled lip portion formed by cutting smooth grooves on the inner surface of both the lip portion at the end of the pin and a torque shoulder on the box such that seal tightness is enhanced owing to elastic deformation (of the same type as one disclosed in Japanese Patent Laid-open No. 60-26878)
*4: a threaded connection provided with a torque shoulder forming face in a concave shape disposed on the box, opposite to a torque shoulder forming face in a convex shape, disposed at the tip of the pin (the same type as one shown in FIG. 3)

TABLE 3

| | markings for threaded connections | |
|---|---|---|
| | K | L |
| outside diameter of a pipe | 88.9 mm | 273.05 mm |
| wall thickness of a pipe | 6.45 mm | 12.57 mm |
| outside diameter of coupling | 98.94 mm | 293.54 mm |
| material for the pipe and coupling | L80 carbon steel (yield strength: 56.2 kgf/mm$^2$ | |
| thread shape | trapezoidal thread | |
| thread pitch | 4.233 mm | 6.35 mm |
| taper of threaded portion | 1/18 | |
| thread ridge height | 1.016 mm | 1.982 mm |
| interference of a threaded portion (in the direction of dia.) | 0.221 mm | 0.272 mm |
| taper of a seal portion | 1/10 | |
| length of a seal portion | 6.5 mm | |
| interference of a seal portion (in the direction of dia.) | 0.42 mm | 0.8 mm |
| 80% of tensile load value | 75.2 tons | 462.8 tons |
| 80% of internal pressure value | 6.53 kgf/mm$^2$ | 4.14 kgf/mm$^2$ |

TABLE 4

| | embodiments of the invention | |
|---|---|---|
| markings for threaded connections | K | L |
| inclination of the torque shoulder forming face on the pin ($\theta$ 1) | 15.0° | 15.0° |
| inclination of the torque shoulder forming face on the box ($\theta$ 2) | 15.5° | 17.5° |
| remarks | internal shoulder | internal shoulder |

The following tests were conducted on the threaded connections described above to evaluate performance of the respective threaded connections.

Test on Repeated Making-up of Threaded Connections

Lubrication grease was applied to the threaded portions and non-threaded portions, and then, making-up and disconnection of the respective threaded connections were repeated ten times, and the changes, having occurred on the torque shoulders, and the changes on the seal portions were both examined.

Test on Crevice Occurrence under Tensile Stress

After the tests on repeated making-up of threaded connections described above, the threaded connections were made up, and with pipes under load of a tensile force (245.2 tons) applied in the axial direction thereof so as to cause a stress equivalent to 80% of yield strength of the pipe, the inner surface and outer surface of the respective torque shoulders were checked for presence of crevices.

Corrosion Test under Composite Load

A gas mixture composed of hydrogen sulfide and carbon dioxide was sealed into the pipes including the respective threaded connections with the tensile force applied as at the crevice occurrence test described above. The pressure of the gas mixture was 5.24 kgf/mm$^2$, causing the pipes a stress equivalent to 80% of the yield strength of the pipe. After holding the respective threaded connections in such a condition described for 500 hours, the threaded connections were disconnected to check up on corrosion sites.

Tables 5 and 6 are lists showing results of the three tests described. Tables 5 and 6 show that in the cases of the threaded connections for comparative examples, the result of at least one test among the three tests was found unsatisfactory. On the other hand, in the cases of the threaded connections according to the invention, the result of every test was found satisfactory. Table 6 shows results of tests conducted on the threaded connections marked K and L wherein the difference in inclination Δθ was varied in proportion to D/t and δr. It was confirmed from the results that it was effective to vary Δθ in proportion to D/t and δr.

forming face (23), provided on an inner surface of a box (21) of a coupling or a pipe body, with female threads formed thereon, while an internal shoulder is formed by butting a torque shoulder forming face (14), provided at a tip of the pin against a torque shoulder forming face (24) provided on the box, opposite to the torque shoulder forming face (14), said threaded connection for the tubular goods satisfying the following conditions (1) and (2):

TABLE 5

|  | markings for threaded connections | results of test on repeated making-up of connections | crevices on the shoulder under axial tensile stress | results of corrosion test under composite stress load | |
|---|---|---|---|---|---|
|  |  |  |  | leakage | corrosion sites |
| embodiments of the invention | A | no change | none | none | none |
|  | B | no change | none | none | none |
|  | C | no change | none | —*1 | —*1 |
|  | D | no change | none | —*1 | —*1 |
|  | E | no change | none | none | none |
| comparative examples | F | no change | yes | none | at the seal portion |
|  | G | no change | yes | —*1 | —*1 |
|  | H | coating worn out | yes | yes(4.62)*2 | —*3 |
|  | I | the inner side of the shoulder deformed | yes | yes(3.23)*3 | —*3 |
|  | J | galling on the shoulder face | none | none | on the box shoulder |

TABLE 6

|  | markings for threaded connections | results of test on repeated making-up | crevices on the shoulder under axial tensile stress | corrosion test results under composite stress load | |
|---|---|---|---|---|---|
|  |  |  |  | leakage | corrosion sites |
| embodiments of the invention | K | no change | none | none | none |
|  | L | no change | none | none | none |

INDUSTRIAL APPLICABILITY

In the threaded connection for the oil country tubular goods, according to the invention, no crevice is formed either on the internal side of the torque shoulder in the case of the internal shoulder type, or on the external side of the torque shoulder in the case of the external shoulder type when used even under conditions subjected to load of a tensile stress due to the weight of connected pipes themselves, and the like. This is why same is unsusceptible to crevice corrosion caused by ingress of fluids flowing inside or outside of the pipes into the interior of the threaded connection through crevices in the torque shoulder region. Further, the threaded connection is able to withstand repeated uses as frequent as scores of times because excessive plastic deformation does not occur to the torque shoulder. In addition, the threaded connection can be manufactured by normal machining via a normal number of process steps, precluding a possibility of an increase in manufacturing cost.

Hence, the threaded connection according to the invention is quite suited for use at oil wells, and the like under increasingly severe exploitation conditions.

We claim:

1. A threaded connection for tubular goods, wherein a seal portion is formed by fitting a seal forming face (13), provided on an outer surface of an end portion of a pin (11) of a pipe body, with male threads formed thereon, into a seal forming face (23), provided on an inner surface of a box (21) of a coupling or a pipe body, with female threads formed thereon, while an internal shoulder is formed by butting a torque shoulder forming face (14), provided at a tip of the pin against a torque shoulder forming face (24) provided on the box, opposite to the torque shoulder forming face (14), said threaded connection for the tubular goods satisfying the following conditions (1) and (2):

(1) The seal forming face on the pin and box, respectively, is a rotatable face, and a pitch diameter of the seal forming face (13) on the pin, prior to making up the threaded connection, is larger than a pitch diameter of the seal forming face (23) on the box, prior to making up the threaded connection; and (2) An inclination (θ1), measured from a plane perpendicular to an axis of the coupling or the pipe, of the torque shoulder forming face on the pin, prior to making up the threaded connection, is smaller than an inclination (θ2), measured from a plane perpendicular to an axis of the coupling or the pipe, of the torque shoulder forming face on the box, prior to making up the threaded connection, the difference (Δθ) between the both inclinations being in the range of 0.5 to 4.0°.

2. A threaded connection for tubular goods, wherein a seal is formed by fitting a seal forming face (53), provided on an outer surface of a pin (11) of a pipe body, close to a base thereof, with male threads formed thereon, into a seal forming face (63), provided on an inner surface of a box (21) of a coupling or a pipe body close to these tips thereof, with female threads formed thereon, while an external shoulder is formed by butting a torque shoulder forming face (64), provided at a tip of the box against a torque shoulder forming face (54), provided on the outer surface of the pin of the pipe body, close to the base thereof, opposite to the torque shoulder forming face (64), said threaded connection for the tubular goods satisfying the following conditions (1), and (3):

(1) The seal forming face on the pin and box, respectively, is a rotatable face, and a pitch diameter of the seal forming face (53) on the pin, prior to making up the threaded connection, is larger than a pitch diameter of the seal forming face (63) on the box, prior to making up the threaded connection; and (3) An inclination ($\theta 1$), measured from a plane perpendicular to an axis of the coupling or the pipe, of the torque shoulder forming face on the pin, prior to making up the threaded connection is larger than an inclination ($\theta 2$), measured from a plane perpendicular to an axis of the coupling or the pipe, of the torque shoulder forming face on the box, prior to making up the threaded connection, a difference ($\Delta\theta$) between both inclinations being in the range of 0.5 to 4.0°.

3. A threaded connection for tubular goods, wherein a seal is formed in respective regions by fitting a seal forming face (13), provided on an outer surface of an end portion of a pin (11) of a pipe body, with male threads formed thereon, into a seal forming face (23), provided on an inner surface of a box (21) of a coupling or a pipe body, with female threads formed thereon, and by fitting a seal forming face (53), provided on the outer surface of a pin (11) of a pipe body, close to thereof, provided with male thread, into a seal forming face (63), provided on the inner surface of a box (21) of a coupling or a pipe body, close to these tips thereof, with female threads formed thereon, while an internal shoulder and an external shoulder are formed respectively, by butting a torque shoulder forming face (14), provided at a tip of the pin against a torque shoulder forming face (24), provided on the box, opposite to the torque shoulder forming face (14), and by butting a torque shoulder forming face (64), provided at the tip of the box against a torque shoulder forming face (54), provided on the outer surface of the pin of the pipe body, close to the base thereof, opposite to the torque shoulder forming face (64), said threaded connection for the tubular goods satisfying the following conditions (1) and (4):

(1) The seal forming faces on the pin and box, respectively, are rotatable faces, and a pitch diameter of the seal forming faces (13, 53), on the pin prior to making up the threaded connection, are larger than a pitch diameter of the seal forming faces (23, 63) on the box, prior to making up the threaded connection;

(4) Regarding to the inclination ($\theta 1$), measured from a plane perpendicular to an axis of the coupling or the pipe, of the torque shoulder forming face on the pin, prior to making up the threaded connection, and the inclination ($\theta 2$), measured from a plane perpendicular to an axis of the coupling or the pipe, of the torque shoulder forming face on the box, prior to making up the threaded connection, $\theta 1$ is smaller than $\theta 2$ for the internal shoulder type and $\theta 1$ is larger than $\theta 2$ for the external shoulder type, the difference ($\Delta\theta$) between both inclinations being in the range of 0.5 to 4.0°.

* * * * *

UNITED STATES PATENT AND TRADEMARK OFFICE
CERTIFICATE OF CORRECTION

PATENT NO.    : 6,045,165
DATED         : April 4, 2000
INVENTOR(S)   : Sugino et al.

Page 1 of 1

It is certified that error appears in the above-identified patent and that said Letters Patent is hereby corrected as shown below:

Cover page, after "[22]" insert:
--Continuation of application PCT/JP97/01855, filed May 30, 1997--.

Column 1,
Line 4, insert:
--This application is a continuation of application PCT/JP97/01855, filed May 30 1997--.

Signed and Sealed this

Nineteenth Day of June, 2001

*Attest:*

NICHOLAS P. GODICI
*Attesting Officer*   *Acting Director of the United States Patent and Trademark Office*